US012671208B2

(12) United States Patent
Yamaguchi et al.

(10) Patent No.: US 12,671,208 B2
(45) Date of Patent: Jun. 30, 2026

(54) CONNECTOR

(71) Applicant: YAZAKI CORPORATION, Tokyo (JP)

(72) Inventors: Yasuhiro Yamaguchi, Kakegawa (JP); Shinsuke Aoshima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 341 days.

(21) Appl. No.: 18/531,620

(22) Filed: Dec. 6, 2023

(65) Prior Publication Data

US 2024/0195121 A1 Jun. 13, 2024

(30) Foreign Application Priority Data

Dec. 7, 2022 (JP) ................................. 2022-195787

(51) Int. Cl.
*H01R 13/52* (2006.01)
*B60L 53/16* (2019.01)

(52) U.S. Cl.
CPC ............ *H01R 13/521* (2013.01); *B60L 53/16* (2019.02)

(58) Field of Classification Search
CPC .............................. H01R 13/531; B60L 53/16
USPC ........................................ 439/487, 274, 275
See application file for complete search history.

(56) References Cited

U.S. PATENT DOCUMENTS

| | | | | |
|---|---|---|---|---|
| 7,766,661 | B2 * | 8/2010 | Kuwahara ........... | H01L 23/3737 |
| | | | | 439/71 |
| 8,363,410 | B2 * | 1/2013 | Kobori ................. | G01R 1/0458 |
| | | | | 165/185 |
| 8,608,508 | B2 * | 12/2013 | Kataoka ............. | H01R 13/5208 |
| | | | | 439/589 |
| 2019/0334293 | A1 | 10/2019 | Iwami et al. | |
| 2022/0069508 | A1 * | 3/2022 | Hashimoto ............... | H02J 7/00 |
| 2022/0216654 | A1 * | 7/2022 | Hashimoto ............. | B60L 53/16 |

FOREIGN PATENT DOCUMENTS

| | | | | |
|---|---|---|---|---|
| JP | 2018-133278 A | 8/2018 | | |
| JP | 2019-192482 A | 10/2019 | | |
| JP | 2020-113448 A | 7/2020 | | |
| WO | WO-2020145119 A1 * | 7/2020 | ........... | H01R 13/533 |

* cited by examiner

*Primary Examiner* — Gary F Paumen
(74) *Attorney, Agent, or Firm* — KENEALY VAIDYA LLP

(57) ABSTRACT

A connector includes: an electric wire; a terminal that is connected to the electric wire; a housing that has an accommodation space therein for accommodating a connection point between the electric wire and the terminal; a seal member that seals an opening of the accommodation space so as to insulate the connection point accommodated in the accommodation space from an outside; and a cylindrical heat storage member that is disposed in the accommodation space so as to surround the connection point. The heat storage member includes a plurality of components in a circumferential direction of the heat storage member, including a component forming a part of the heat storage member and a component forming another part, and is formed by assembling the plurality of components.

4 Claims, 12 Drawing Sheets

1

62  73  72  A  A  64  64  63  60  70

UPPER

LEFT ←——→ RIGHT

LOWER

95e 95d        95c

CONNECTOR

CROSS-REFERENCE TO RELATED APPLICATION(S)

This application is based upon and claims the benefit of priority from prior Japanese patent application No. 2022-195787 filed on Dec. 7, 2022, the entire contents of which are incorporated herein by reference.

BACKGROUND

1. Field of the Invention

The present disclosure relates to a connector that includes an electric wire, a terminal, a housing accommodating a connection point between the electric wire and the terminal, a seal member sealing an opening of an accommodation space, and a heat storage member disposed in the accommodation space.

2. Description of the Related Art

In the related art, the charging connector is proposed, which is installed in a vehicle such as an electric vehicle or a plug-in hybrid vehicle to supply (charge) power from the outside of the vehicle to a battery mounted in the vehicle (see JP2019-192482A and JP2018-133278A, for example). This type of connector is also commonly called a charging inlet.

The type of connector (charging inlet) described above is generally required to have structures and characteristics specified by various standards. For example, in actual use of the connector described above, the temperature (so-called operating temperature) of the terminal increases due to Joule heat that is generated in the terminal upon energization. Therefore, from the viewpoint of quality maintenance, safety, and the like of the connector, the upper limit of the operating temperature of the terminal, and the like is determined by a predetermined standard.

However, in the connector described above in the related art, the connection point between the terminal and the electric wire generates a large amount of heat due to the large contact resistance, but the connection point is sealed with packing or the like and insulated from the outside from the viewpoint of waterproofing and the like. Furthermore, the air in this insulated space also acts as a heat insulating material. Therefore, it is considered very difficult to dissipate the heat to the outside from the connection point between the terminal and the electric wire. In addition, for example, when rapidly charging a battery, and the like, since a large current passes through the connector in a short period of time, the degree of temperature rise of the terminal (particularly, the connection point described above) per unit time is higher than that in the case of normal charging. For these reasons, in the connector in the related art, it may be difficult to keep the operating temperature of the terminal within the range specified by the standards described above only by natural heat dissipation.

The present disclosure has been made in view of the situation described above, and it is an object of the present disclosure to provide a connector capable of suppressing an excessive rise in the operating temperature of the terminal while avoiding an increase in the size of the connector.

SUMMARY

In order to achieve the object described above, a connector according to the present disclosure has the following characteristics.

According to an aspect of the present disclosure, there is provided a connector including: an electric wire; a terminal that is connected to the electric wire; a housing that has an accommodation space therein for accommodating a connection point between the electric wire and the terminal; a seal member that seals an opening of the accommodation space so as to insulate the connection point accommodated in the accommodation space from an outside; and a cylindrical heat storage member that is disposed in the accommodation space so as to surround the connection point, where the heat storage member includes a plurality of components in a circumferential direction of the heat storage member, including a component forming a part of the heat storage member and a component forming another part, and is formed by assembling the plurality of components.

According to the connector of the present disclosure, the connection point between the electric wire and the terminal, and the heat storage member are accommodated in the accommodation space in the housing. In other words, the heat storage member is disposed so as to reduce the gap around the connection point in the accommodation space. As a result, the heat generated at the connection point between the electric wire and the terminal upon energization is absorbed by the heat storage member with a large heat capacity, so that even when a large amount of heat is generated at the connection point per unit time, for example, when rapidly charging, a sudden increase in the operating temperature of the terminal can be suppressed and the operating temperature of the terminal can be gradually increased. Furthermore, due to the presence of the heat storage member in the accommodation space, the amount of air in the accommodation space that acts as a heat insulating material can be reduced. Therefore, with the connector having this configuration, it is possible to suppress an excessive rise in the operating temperature of the terminal while avoiding an increase in the size of the connector.

Furthermore, according to the connector configured as described above, the heat storage member has a cylindrical shape, includes a plurality of components in a circumferential direction, including a component forming a part and a component forming another part, and is formed by assembling the plurality of components. In other words, the cylindrical heat storage member is divided into the plurality of components in the circumferential direction, and the heat storage member is configured by assembling the plurality of divided components. As a result, for example, by assembling the plurality of components after connecting the electric wires and the terminals, without requiring a pre-process such as passing the electric wires through the cylinder of the heat storage member before connecting the electric wires and the terminals (e.g., before crimping terminals), the heat storage member can be disposed to surround the connection point. Therefore, the degree of freedom in the manufacturing process of the connector is improved.

The present disclosure has been briefly described above. Furthermore, the details of the present disclosure will be further clarified by reading embodiments of the disclosure described below with reference to the attached drawings.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

Figure 1:
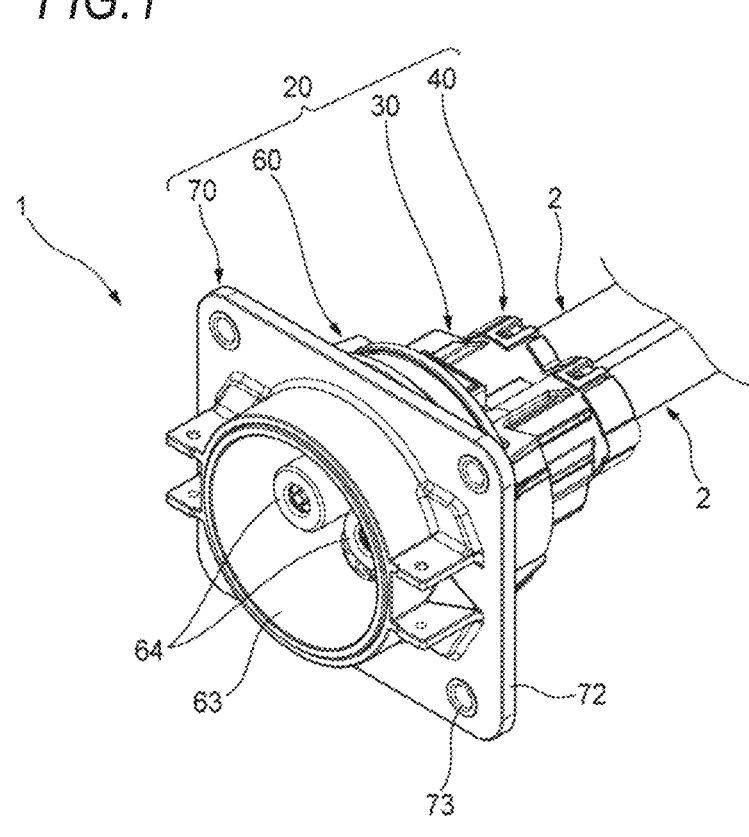
FIG. 1 is a perspective view showing a state in which a connector according to an embodiment of the present disclosure is connected to an electric wire.
Figure 1:
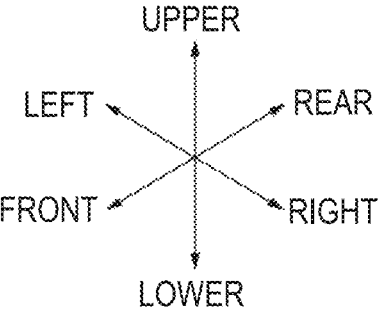
Figure 2:
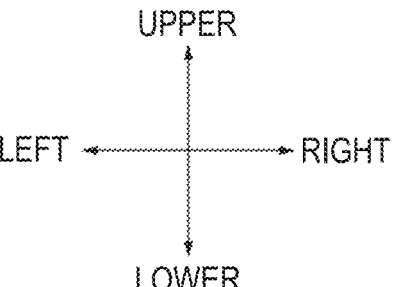
FIG. 2 is a front view of the connector shown in FIG. 1.

Hereinafter, a connector 1 according to an embodiment of the present disclosure will be described with reference to the drawings. The connector 1 is a connector that is installed in a vehicle such as a plug-in hybrid vehicle or an electric vehicle and connected to an electric wire extending from a battery mounted in the vehicle. The connector 1 is also called a charging inlet. By fitting a mating connector (so-called charging gun) into a fitting recess 63 (see FIG. 1, and the like) of the connector 1, power is supplied to the battery from an outside of the vehicle, charging the battery.

Hereinafter, for convenience of explanation, "front", "rear", "left", "right", "upper", and "lower" is defined as shown in the drawing such as FIG. 1. A "front-rear direction", a "left-right direction", and an "up-down direction" are orthogonal to one another. The front-rear direction corresponds to a fitting direction in which the connector 1 and a mating connector (not shown) are fitted together, and when viewed from the connector 1, a front side in the fitting direction (the side that approaches the mating connector) is called "front side", and when viewed from the connector 1, a release side in the fitting direction (the side that moves away from the mating connector) is called "rear side".

Figure 12:
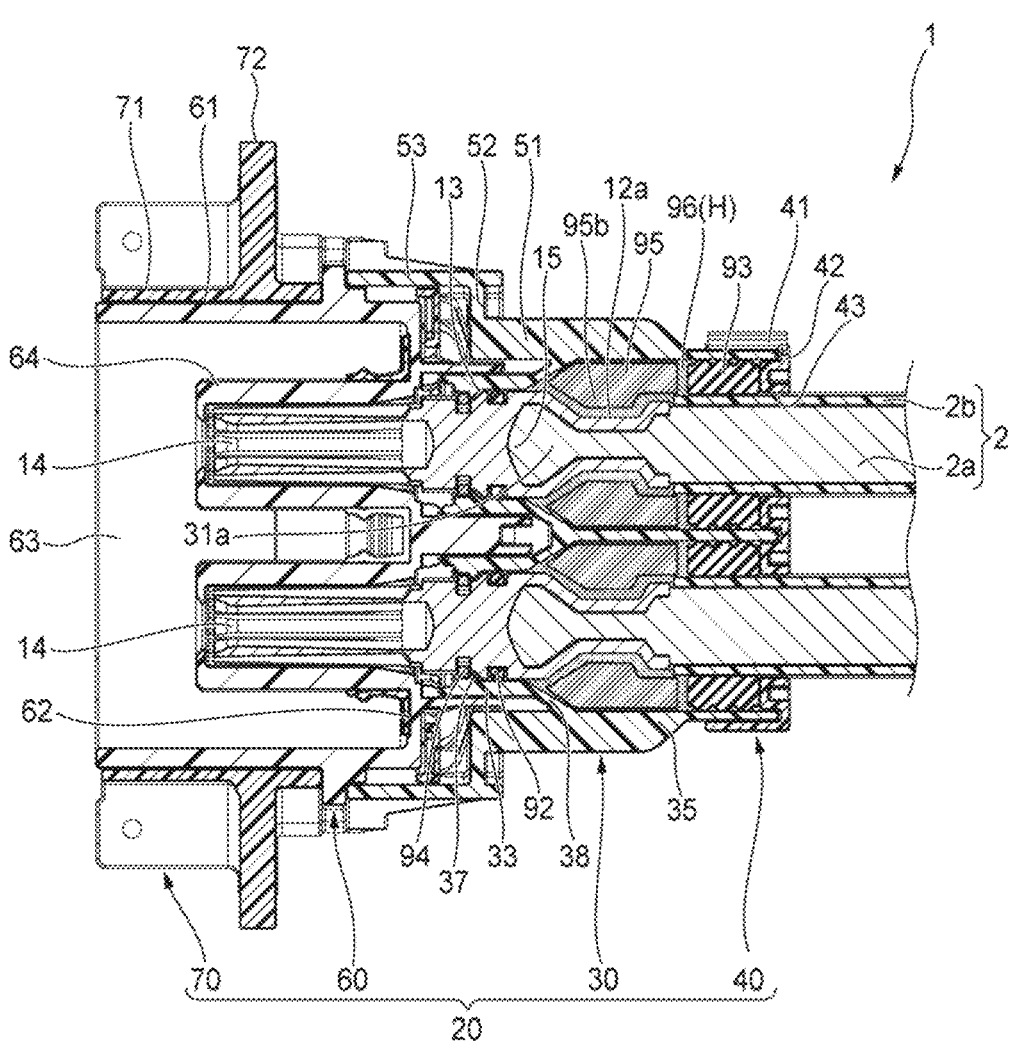
FIG. 12 is a cross-sectional view taken along line A-A in FIG. 2.
Figure 12:
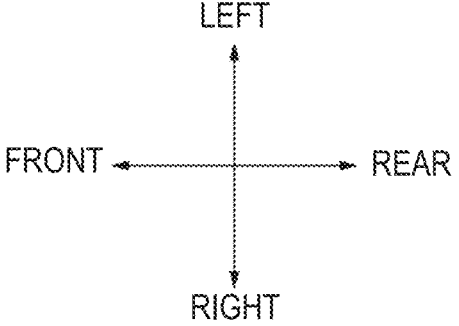

As shown in the drawing such as FIGS. 1 and 12, the connector 1 includes a pair of terminals 10, and a housing 20 in which the pair of terminals 10 are housed. One ends of a pair of electric wires 2 are connected to the pair of terminals 10, respectively. The other ends of the pair of electric wires 2 are connected to the battery (not shown). The electric wire 2 includes a conductor core wire 2a and an insulating resin sheathing 2b that covers the conductor core wire 2a (see FIG. 12). Hereinafter, components of the connector 1 will be described in order.

Figure 4:
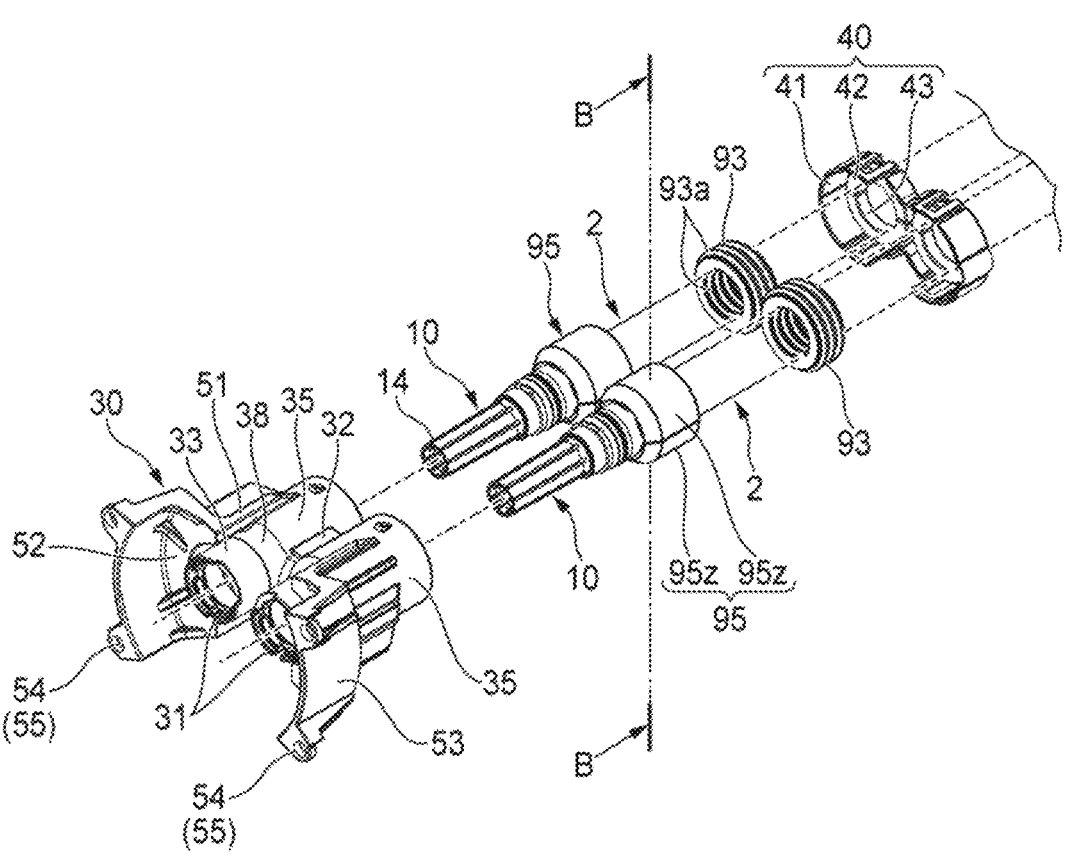
FIG. 4 is a perspective view showing a state in which another part of the plurality of components of the connector shown in FIG. 1 is disassembled.
Figure 4:
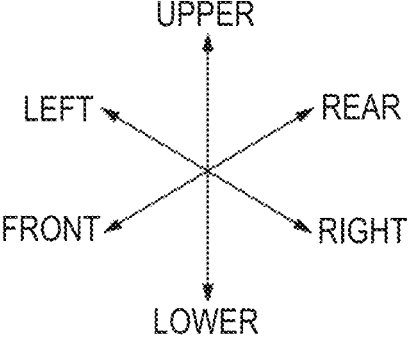
Figure 5:
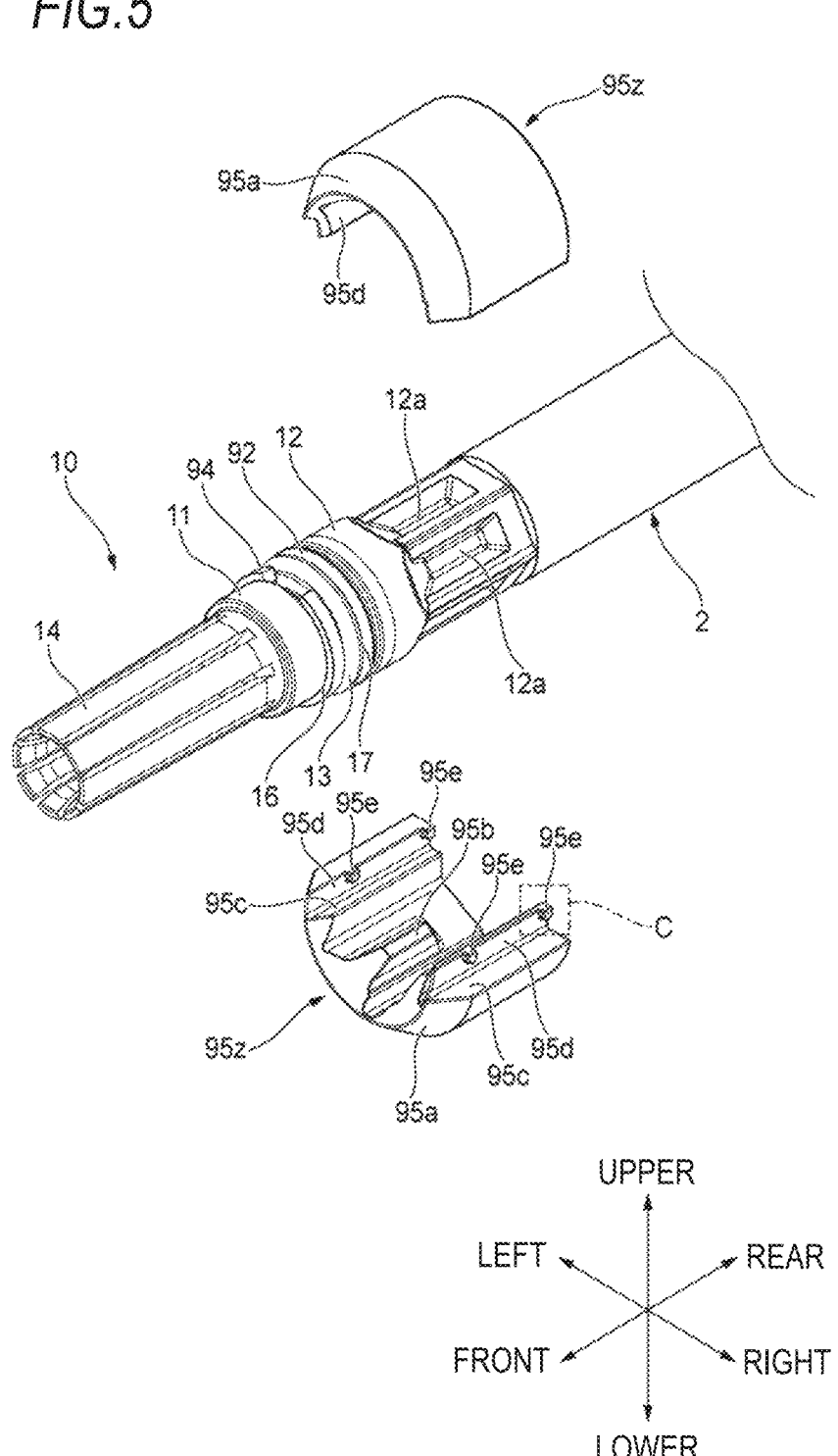
FIG. 5 is a perspective view showing a pair of upper and lower heat storage division bodies forming a heat storage member, and a terminal connected to the electric wire.

First, the pair of terminals 10 will be described. In the present embodiment, the pair of terminals 10 have the same shape. Each of the terminals 10 is made of metal, and includes a stepped cylindrical portion including a small diameter portion 11 and a large diameter portion 12 located on the rear side of the small diameter portion 11 as shown in FIGS. 4 and 5. An annular stepped portion 13 is formed at a boundary between the small diameter portion 11 and the large diameter portion 12. The stepped portion 13 is locked to a locking protrusion 37 (see FIG. 12) of a base holder 30, which will be described below.

The small diameter portion 11 is integrally provided with a cylindrical female terminal portion 14 protruding forward from a front end surface thereof. The female terminal portion 14 of one terminal 10 of the pair of terminals 10 serves as a positive side terminal, and the female terminal portion 14 of the other terminal 10 serves as a negative side terminal. When the connector 1 and the mating connector are fitted together, the female terminal portion 14 of the one terminal 10 and the female terminal portion 14 of the other terminal 10 are respectively connected to a positive side male terminal portion and a negative side male terminal portion of the mating connector.

A recess 15 recessed forward is formed in a rear end surface of the large diameter portion 12 (see FIG. 12). The conductor core wire 2a exposed at the one end of the electric wire 2 is inserted into the recess 15 and fixed by crimping. In the present embodiment, as a result of crimping, concave crimping marks 12a are formed at a plurality of locations (six locations) in the circumferential direction on an outer circumferential surface of the large diameter portion 12 (see FIGS. 5 and 11). Accordingly, the terminal 10 and the one end of the electric wire 2 are electrically connected. The large diameter portion 12 of the terminal 10 and the conductor core wire 2a of the electric wire 2 form a "connection point" between the electric wire 2 and the terminal 10.

As shown in FIG. 5, an annular groove 16 is formed on an outer circumferential surface of the small diameter portion 11 near the stepped portion 13, and an annular groove 17 is formed on the outer circumferential surface of the large diameter portion 12 near the stepped portion 13. A C-ring 94 (see FIGS. 5 and 12), which will be described below, is attached to the annular groove 16, and an O-ring 92 (see FIGS. 5 and 12), which will be described below, is attached to the annular groove 17. The pair of terminals 10 has been described above.

Next, the housing 20 will be described. The housing 20 includes the base holder 30, a rear holder 40, an inner housing main body 60, and an outer housing main body 70, as shown in the drawing such as FIGS. 1 and 12. Each of the base holder 30, the rear holder 40, the inner housing main body 60, and the outer housing main body 70 is a skeletal component of the housing 20 and forms a part of the outer surface of the housing 20. Hereinafter, each of the components of the housing 20 will be described in order. In addition, the "skeletal component" of the housing 20 refers to a component that has sufficient hardness and strength to maintain the shape of the housing 20 itself so as to hold the position of the terminal 10 against external forces applied to the terminal 10 when the terminal 10 and the mating terminal (not shown) are fitted together, for example. In other words, the "skeletal component" refers to a component made of a material that does not soften or embrittle to the extent that it is difficult to maintain the shape due to an increase in the operating temperature of the terminal 10.

First, the base holder 30 will be described. The base holder 30 has a function of holding the pair of terminals 10 spaced apart and insulated from each other in the left-right direction. The base holder 30 is a resin molded product, and is integrally equipped with a pair of terminal holding parts 31 arranged in the left-right direction, and a connecting part 32 that connects the pair of terminal holding parts 31 to each other in the left-right direction as shown in FIG. 4.

As shown in FIG. 4, each terminal holding part 31 has a stepped cylindrical shape extending in the front-rear direction and includes a small diameter portion 33 and a large diameter portion 35 located on the rear side of the small diameter portion 33. The connecting part 32 connects the large diameter portions 35 of the pair of terminal holding parts 31 to each other. The pair of terminals 10 are inserted into internal spaces 31a (see FIG. 12) of the pair of terminal holding parts 31 from the rear side.

An annular stepped portion 38 (see FIGS. 4 and 12) is formed at the boundary between the small diameter portion 33 and the large diameter portion 35. The annular locking protrusion 37 corresponding to the stepped portion 13 of the terminal 10 is formed on an inner wall surface of a front end of the small diameter portion 33, and protrudes inward in a radial direction of the small diameter portion 33 (see FIG. 12).

Figure 3:
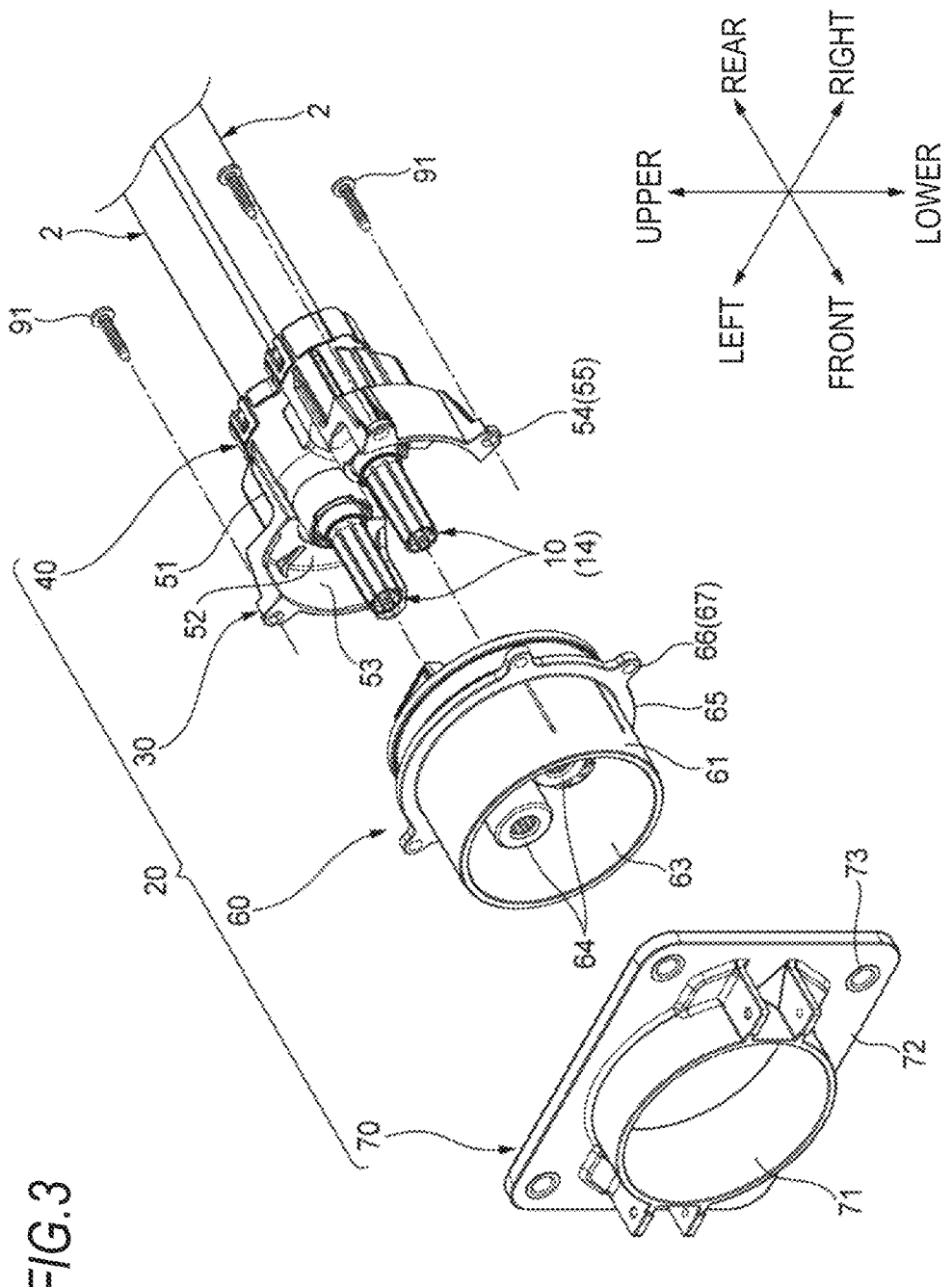
FIG. 3 is a perspective view showing a state in which a part of a plurality of components of the connector shown in FIG. 1 is disassembled.

The base holder 30 further includes a pair of protrusions 51 extending forward in the front-rear direction from the pair of large diameter portions 35, as shown in FIGS. 3, 4, and 12. Front ends of the pair of protrusions 51 are integrally provided with a pair of extension portions 52 extending outward in the left-right direction from both sides in the left-right direction of the front end and a pair of side wall portions 53 extending forward from extending ends of the pair of extending portions 52. The pair of side wall portions 53 have a shape corresponding to a part of an outer circumferential shape (cylindrical shape) of a later-described cylindrical portion 61 (see also FIG. 3) of the inner housing main body 60 in the circumferential direction when viewed from the front-rear direction, and are attachable to the cylindrical portion 61 so as to cover an outer circumferential surface of a rear end of the cylindrical portion 61.

As shown in FIGS. 3 and 4, bolt insertion portions 54 are provided at a plurality of locations (four locations in the present embodiment) on outer circumferential surfaces (outer surfaces in the left-right direction) of the pair of side wall portions 53, respectively. Each bolt insertion portion 54 is formed with a bolt insertion hole 55 penetrating in the front-rear direction. A bolt 91 (see FIG. 3) for assembling the housing 20 is inserted into the bolt insertion hole 55.

Next, the rear holder 40 will be described. The rear holder 40 is assembled to the base holder 30 from the rear side, and has a function of holding the pair of electric wires 2 extending rearward from the pair of terminals 10 with a space defined therebetween in the left-right direction. The rear holder 40 is a resin molded product, and is integrally equipped with a cylindrical portion 41 extending in the front-rear direction and a rear wall portion 42 that closes a rear opening of the cylindrical portion 41 as shown in FIG. 4.

The cylindrical portion 41 has an outer circumferential shape corresponding to an outer circumferential shape formed by the pair of large diameter portions 35 and the connecting part 32 of the base holder 30, and is attachable to a rear end of the base holder 30 so as to cover the outer circumferential surfaces of the pair of large diameter portions 35 and a rear end of the connecting part 32. A pair of wire insertion holes 43 corresponding to the pair of large diameter portions 35 are formed in the rear wall portion 42, are arranged in the left-right direction, and penetrate in the front-rear direction. The pair of electric wires 2 are inserted into the pair of electric wire insertion holes 43 (see FIG. 12).

Next, the inner housing main body 60 will be described. The inner housing main body 60 is assembled to the pair of side wall portions 53 of the base holder 30 from the front side, and also has a function of forming the fitting recess 63

(see also FIG. 1) of the connector 1. The inner housing main body 60 is a resin molded product, and is integrally equipped with the cylindrical portion 61 extending in the front-rear direction and a rear wall portion 62 that closes a rear opening of the cylindrical portion 61. The cylindrical portion 61 and the rear wall portion 62 define the fitting recess 63 that is open toward the front and recessed toward the rear.

A pair of cylindrical female terminal accommodating portions 64 corresponding to the female terminal portions 14 of the pair of terminals 10 are provided in the rear wall portion 62 and protrude to the front (see FIGS. 3 and 12). Each female terminal accommodating portion 64 is located in the fitting recess 63 and has an internal space penetrating in the front-rear direction.

As shown in FIG. 3, an annular flange portion 65 protruding outward in a radial direction of the cylindrical portion 61 is provided at a position on an outer circumferential surface of the cylindrical portion 61 on the rear side from a center in the front-rear direction. The flange portion 65 is provided with bolt insertion portions 66 corresponding to the plurality of bolt insertion portions 54 of the base holder 30, respectively, which are formed at a plurality of locations (four locations, in the present embodiment) in the circumferential direction. Each bolt insertion portion 66 is formed with a bolt insertion hole 67 penetrating in the front-rear direction. The bolt 91 (see FIG. 3) for assembling the housing 20 is inserted into the bolt insertion hole 67.

Next, the outer housing main body 70 will be described. The outer housing main body 70 is assembled to the cylindrical portion 61 of the inner housing main body 60 from the front side, and has a function of fixing the entire housing 20 to an attachment target portion (not shown) of the connector 1 provided in the vehicle. The outer housing main body 70 is a resin molded product and includes a cylindrical portion 71 extending in the front-rear direction. The cylindrical portion 71 is attachable to the cylindrical portion 61 from the front side so as to cover the outer circumferential surface of the cylindrical portion 61 of the inner housing main body 60 (see FIG. 12).

As shown in FIG. 3, an annular flange portion 72 protruding outward in a radial direction of the cylindrical portion 71 is provided at a position on an outer circumferential surface of the cylindrical portion 71 on the rear side from a center in the front-rear direction. The flange portion 72 has a rectangular outer circumferential shape when viewed from the front-rear direction. The four corners of the flange portion 72 are each formed with bolt insertion holes 73 penetrating in the front-rear direction. A bolt (not shown) for fixing the connector 1 to the above-mentioned attachment target portion of the connector 1 is inserted into the bolt insertion hole 73.

Each of the components of the housing 20 has been described above.

Next, a procedure of assembling the connector 1 will be described. First, the pair of terminals 10 to which the one ends of the pair of electric wires 2 are connected are inserted into the base holder 30. Therefore, in preparation for this, as shown in FIGS. 4 and 12, the pair of electric wire insertion holes 43 of the rear holder 40 are inserted into the sheathings 2b of the pair of electric wires 2 connected to the pair of terminals 10 from the front side, and then a cylindrical rubber packing 93 extending in the front-rear direction is inserted into each of the sheathings 2b of the pair of electric wires from the front side to be adjacent to the front side of the rear wall portion 42 of the rear holder 40. Furthermore, the rubber O-ring 92 (see FIGS. 5 and 12) is attached to each of the annular grooves 17 of the pair of terminals 10.

Next, a cylindrical heat storage member 95 extending in the front-rear direction is attached to the large diameter portion 12 so as to surround an outer circumference of the large diameter portion 12 of each terminal 10 (see FIGS. 4 and 7 to 9). A front end of the cylindrical heat storage member 95 is provided with a tapered portion 95a that slopes along an inner circumferential surface of the stepped portion 38 (see FIG. 12) of the base holder 30. The heat storage member 95 is made of a metal material capable of storing sensible heat, and has a function of absorbing heat generated at the connection point between the electric wire 2 and the terminal 10 and dissipating the heat to the outside (This will be described below).

Figure 7:
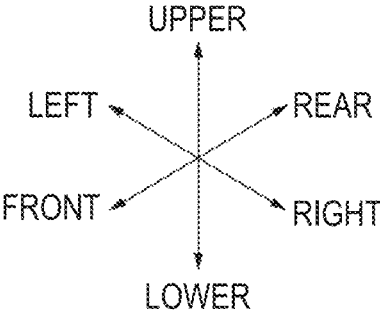
FIG. 7 is a perspective view of the heat storage member.

In the present embodiment, the heat storage member 95 is formed by assembling a pair of upper and lower substantially semi-cylindrical heat storage division bodies 95z to each other (see FIGS. 5 and 7). The pair of upper and lower heat storage division bodies 95z have the same shape, and the upper heat storage division body 95z is obtained by vertically inverting the lower heat storage division body 95z while maintaining an orientation in the front-rear direction (by rotating the lower heat storage division body 95z by 180 degrees around an axis extending in the front-rear direction).

Figure 6:
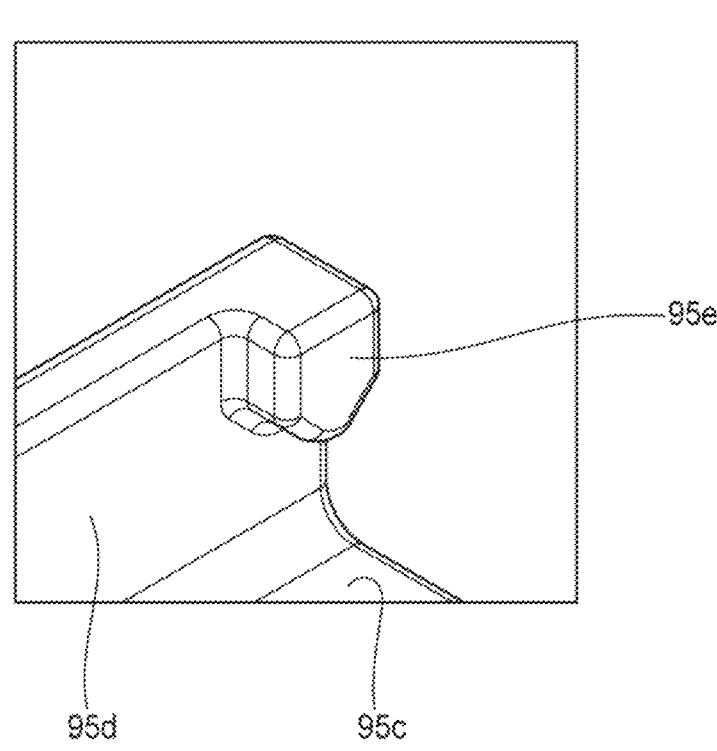
FIG. 6 is an enlarged view of part C of FIG. 5.
Figure 6:
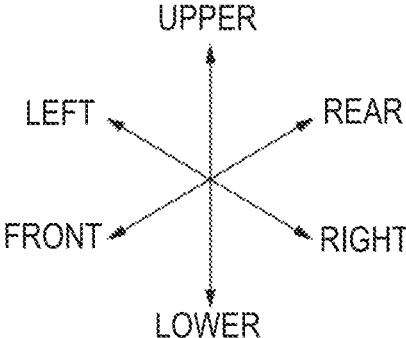
Figure 8:
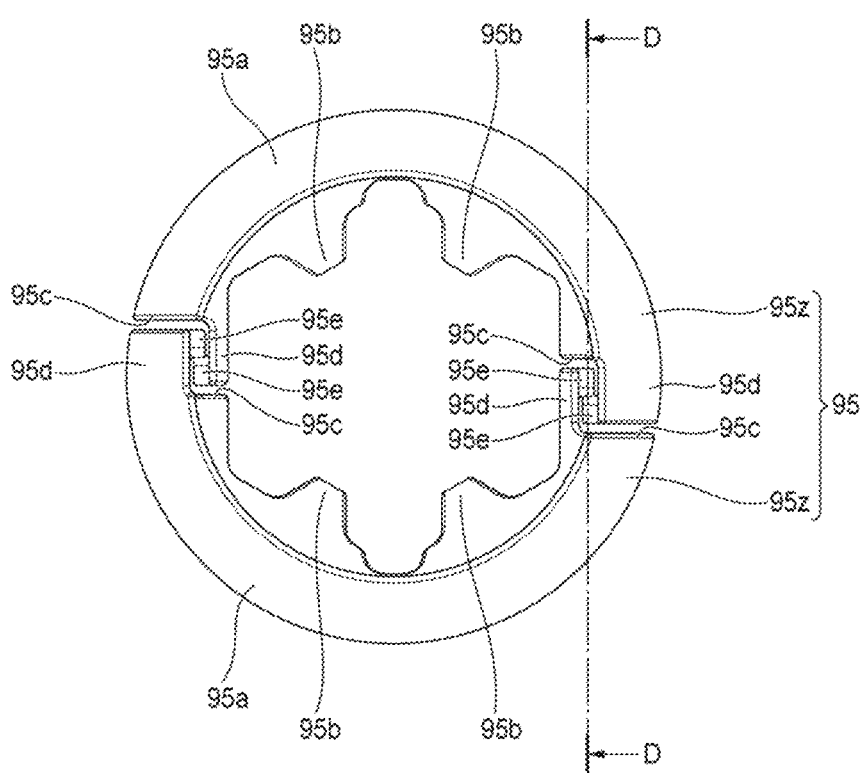
FIG. 8 is a front view of the heat storage member.
Figure 8:
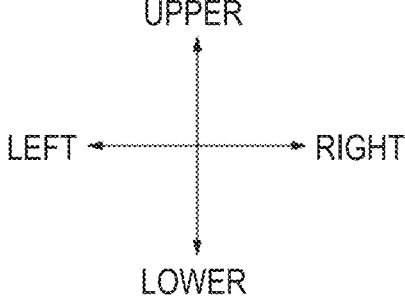
Figure 9:
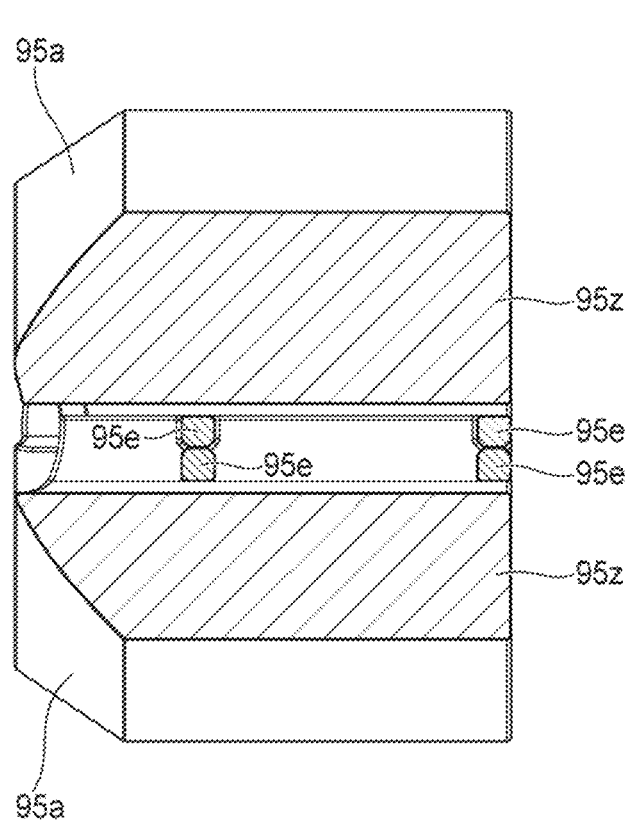
FIG. 9 is a cross-sectional view taken along line D-D in FIG. 8.
Figure 9:
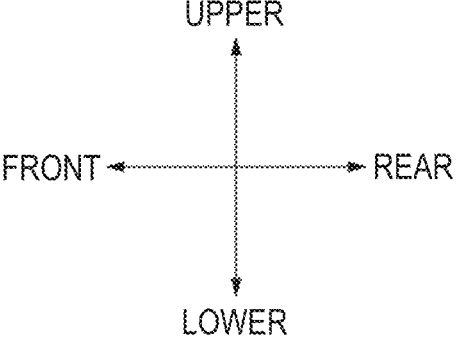

As shown in FIGS. 5 and 8, on an inner circumferential surface of the substantially semi-cylindrical heat storage division body 95z, protrusions 95b protruding inward in the radial direction and extending in the front-rear direction are provided at two locations in the circumferential direction, respectively, which correspond to two crimping marks 12a adjacent to each other in the circumferential direction of the plurality (six) of crimping marks 12a of the large diameter portion 12 of the terminal 10. On each of end surfaces 95c (plane perpendicular to the up-down direction) on both sides in the circumferential direction of the heat storage division body 95z, a side wall 95d protrudes in the up-down direction from an area on the same side in the left-right direction (on the left side in the lower heat storage division body 95z) of the end surface 95c and extends in the front-rear direction. At each of a plurality of locations in the front-rear direction (two locations in the front-rear direction in the present embodiment, that is, four locations in total) on protruding ends of the pair of side walls 95d (see also FIG. 6), a protrusion 95e protrudes on the same side in the left-right direction (the right side in the lower heat storage division body 95z).

In order to attach the heat storage member 95 to the outer circumference of the large diameter portion 12 of the terminal 10, first, the pair of upper and lower heat storage division bodies 95z are respectively arranged in the large diameter portion 12 so as to cover the outer circumference of the large diameter portion 12 from both the upper and lower sides, and then assembled with each other. More specifically, in a state in which, first, the two protrusions 95b of the upper heat storage division body 95z are respectively accommodated (fitted) in the two crimping marks 12a located on the upper side of the large diameter portion 12 (see FIG. 11), and the two protrusions 95b of the lower heat storage division body 95z are respectively accommodated (fitted) in the two crimping marks 12a located on the lower side of the large diameter portion 12 (see FIG. 11), and the pair of upper and lower heat storage division bodies 95z are relatively shifted in the front-rear direction such that the protrusions 95e of the upper heat storage division body 95z and the protrusions 95e of the lower heat storage division body 95z do not overlap with each other in the front-rear direction (see FIG. 10), the pair of upper and lower heat storage division bodies 95z are arranged on the outer circumference of the large diameter portion 12 such that the pair of end surfaces 95c and the protruding end surfaces of the pair of side walls 95d of the upper heat storage division body 95z abut on the protruding end surfaces of the pair of side walls 95d and the pair of end surfaces 95c of the lower heat storage division body 95z, respectively (see FIG. 11).

Figure 10:
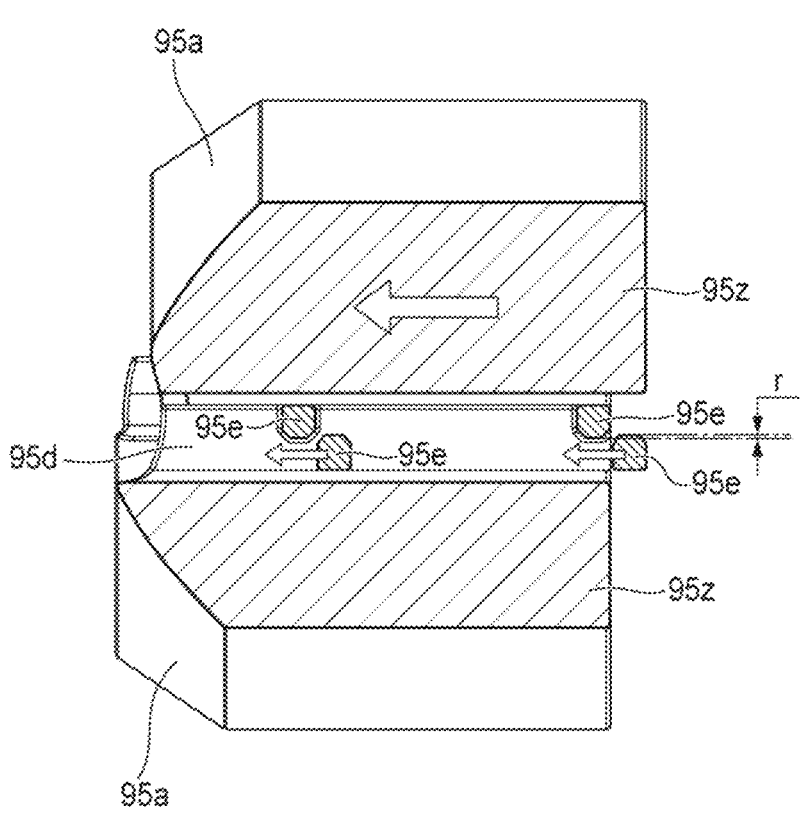
FIG. 10 is a view corresponding to FIG. 9, provided to explain a procedure for attaching the pair of upper and lower heat storage division bodies to the terminal.
Figure 10:
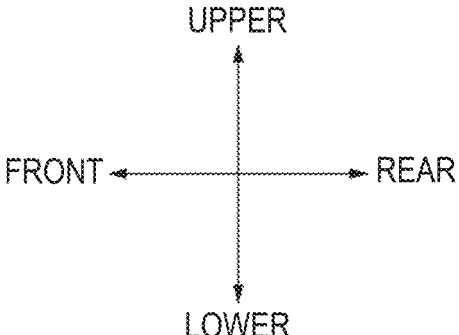

In this state, as shown in FIG. 10, the protrusion 95e of the upper heat storage division body 95z is located below the protrusion 95e of the lower heat storage division body 95z, and the protrusion 95e of the upper heat storage division body 95z and the protrusion 95e of the lower heat storage division body 95z overlap with each other in the up-down direction by a slight overlap amount (r). Next, as shown by white arrows in FIG. 10, the pair of upper and lower heat storage division bodies 95z are relatively moved in the front-rear direction, in a direction in which the relative displacement in the front-rear direction of the pair of upper and lower heat storage division bodies 95z is eliminated. In this process, the protrusion 95e of the upper heat storage division body 95z enters the lower side of the protrusion 95e of the lower heat storage division body 95z while eliminating the slight overlap amount (r) due to elastic deformation around the protrusion 95e, and due to an elastic restoring force around the protrusion 95e, an upper surface of the protrusion 95e of the upper heat storage division body 95z and a lower surface of the protrusion 95e of the lower heat storage division body 95z slide while being brought into pressing contact with each other. Such relative movement of the pair of upper and lower heat storage division bodies 95z continues until the pair of upper and lower heat storage division bodies 95z are arranged at the same position in the front-rear direction (see FIG. 9). When the pair of upper and lower heat storage division bodies 95z are arranged at the same position in the front-rear direction, attachment of the heat storage member 95 to the outer circumference of the large diameter portion 12 of the terminal 10 is complete.

Figure 11:
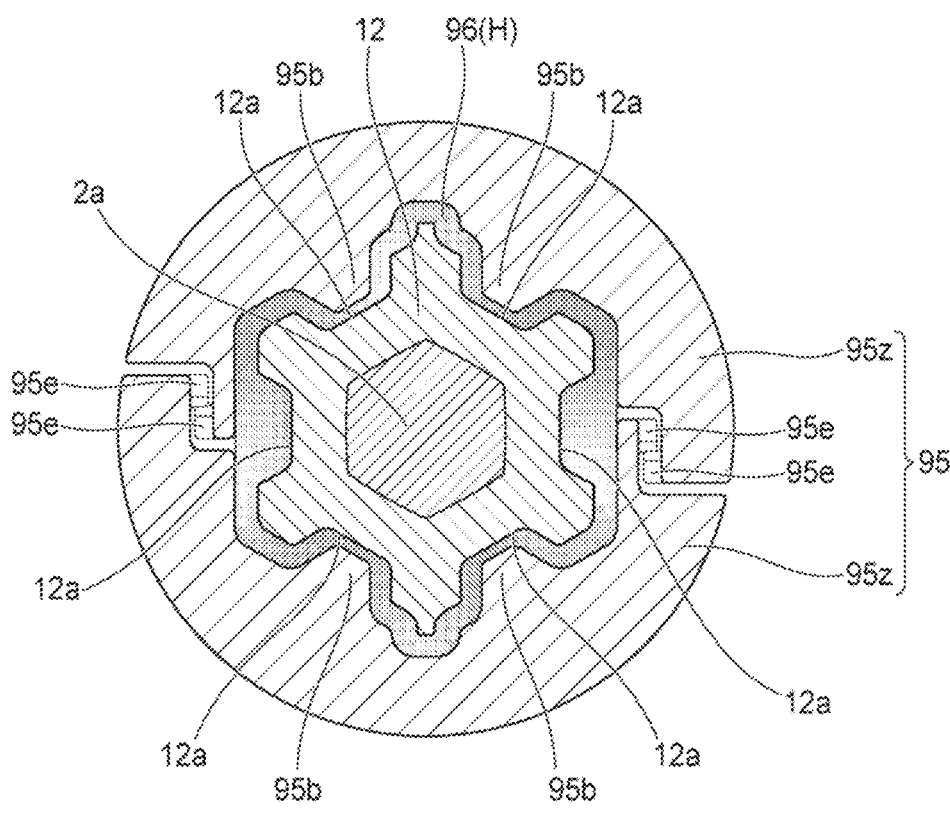
FIG. 11 is a cross-sectional view taken along line B-B in FIG. 4.
Figure 11:
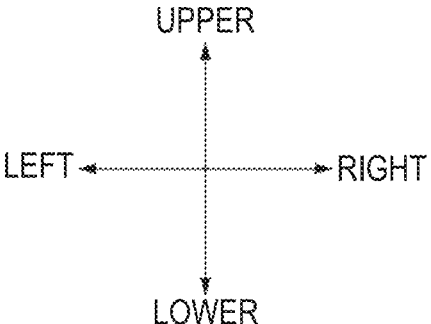

When the heat storage member 95 is completely attached, as shown in FIG. 11, each protrusion 95b is fitted into the corresponding crimping mark 12a, and in this state, the cylindrical heat storage member 95 including the pair of upper and lower heat storage division bodies 95z is attached to the large diameter portion 12 so as to surround the outer circumference of the large diameter portion 12 of the terminal 10. The above-mentioned elastic restoring force around the protrusions 95e maintains the state in which the vertically adjacent protrusions 95e come into pressing contact with each other, so that the pair of upper and lower heat storage division bodies 95z are firmly held together. In other words, the upper and lower adjacent protrusions 95e are engaged with each other, so that the pair of upper and lower heat storage division bodies 95z are biased in a direction of approaching each other. From the viewpoint of more efficient heat transfer, it is preferable that a recessed surface of the crimping mark 12a of the terminal 10 and the protrusion 95b of the heat storage member 95 are brought into close contact with each other so as to contact each other. In this example, although not shown, an inner circumferential surface of the cylindrical heat storage member 95 is in contact with the outer circumferential surface of the large diameter portion 12 of the terminal 10 at least in part.

Next, the pair of terminals 10 are inserted into the internal spaces 31a (see FIG. 12) of the pair of terminal holding parts 31 of the base holder 30 from the rear side. This insertion continues until the small diameter portions 11 and the female terminal portions 14 of the pair of terminals 10 protrude to the front side from the front ends of the pair of terminal holding parts 31 and the stepped portions 13 of the pair of terminals 10 are locked to the locking protrusions 37 of the pair of terminal holding parts 31. In a state in which this insertion is completed (that is, the state in which the insertion of the pair of terminals 10 into the base holder 30 is completed), as shown in FIG. 12, the O-ring 92 attached to the terminal 10 comes into pressing contact with the inner wall surface of the small diameter portion 33 of the terminal holding part 31. Further, each heat storage member 95 is located in a gap (that is, in the internal space 31a) between the outer circumferential surface of the large diameter portion 12 of the terminal 10 and the inner circumferential surface of the large diameter portion 35 of the terminal holding part 31. The outer circumferential surface of the heat storage member 95 comes into contact with the inner circumferential surface of the large diameter portion 35 of the base holder 30 at least in part.

Next, the metal C-ring 94 is attached to the annular groove 16 of the small diameter portion 11 of the terminal 10 that protrudes to the front side from the front end of each terminal holding part 31 of the base holder 30 (see FIGS. 5 and 12). Accordingly, the engagement between the C ring 94 and the locking protrusion 37 of the terminal holding part 31 prevents the terminal 10 from coming off backward from the base holder 30.

Next, a predetermined amount of a heat transfer member 96 is injected into the internal space 31a (more specifically, into the gap remaining between the outer circumferential surfaces of the electric wire 2 and the terminal 10 and the inner circumferential surface of the terminal holding part 31 (the large diameter portion 35), see FIG. 12) of the pair of terminal holding parts 31 of the base holder 30. The heat transfer member 96 is formed by mixing a substance such as alumina particles that promotes heat transfer into a base material such as grease or silicone paste that has fluidity and viscosity. The heat transfer member 96 has a function of promoting heat transfer from the connection point between the electric wire 2 and the terminal 10 to the heat storage member 95 (that is, promoting heat absorption from the connection point) and heat transfer (furthermore, heat dissipation to the outside of the housing 20) from the heat storage member 95 to the terminal holding part 31 (This will be described below).

Next, the rear holder 40 is attached to the base holder 30. Therefore, by pressing the rear holder 40 to the front side and moving the rear holder 40 and a pair of packings 93 located on the front side of the rear holder 40 to the front side with respect to the pair of electric wires 2, the cylindrical portion 41 of the rear holder 40 is attached to the rear end of the base holder 30 (see FIGS. 3 and 12).

When the attachment of the rear holder 40 to the base holder 30 is completed, as shown in FIG. 12, the heat transfer member 96 located in the internal space 31a of the terminal holding part 31 is located in the internal space 31a so as to fill a gap H remaining around the heat storage member 95. For example, the gap H generated between the heat storage member 95, the inner wall surface of the base holder 30, the outer wall surface of the terminal 10, and the electric wire 2 is filled with the heat transfer member 96. Furthermore, the gap H generated between the crimping mark 12a of the large diameter portion 12 of the terminal 10 and the protrusion 95b of the heat storage member 95 fitted into the crimping mark 12a is also filled with the heat transfer member 96 (see FIG. 11). The effect of the heat transfer member 96 filling the gap H will be described below.

Furthermore, each packing 93 is pressed and sandwiched between the inner wall surface of the large diameter portion 35 of the terminal holding part 31 and the outer circumferential surface of the electric wire 2 (the sheathing 2b). Specifically, a plurality of ribs 93a of each packing 93 are pressed against the inner wall surface of the large diameter portion 35 and the outer circumferential surface of the electric wire 2 (the sheathing 2b). As a result, the pair of O-rings 92 and the pair of packings 93 implement water-stopping functions, so that the internal spaces 31a of the pair of terminal holding parts 31 are insulated from the outside. As a result, ingress of water from the outside into the internal spaces 31a of the pair of terminal holding parts 31 (that is, into the connection point between the electric wire 2 and the terminal 10) is suppressed. Furthermore, the pair of terminals 10 are held by the base holder 30 in a state in which the pair of terminals 10 are spaced apart and insulated from each other in the left-right direction, and the pair of electric wires 2 extending rearward from the pair of terminals 10 are held by the rear holder 40 with a space defined therebetween in the left-right direction.

When the attachment of the rear holder 40 to the base holder 30 is completed, the inner housing main body 60 is then attached to the base holder 30 (see FIGS. 3 and 12). Therefore, the inner housing main body 60 is attached to the base holder 30 from the front side such that the pair of side wall portions 53 of the base holder 30 cover a part of the outer circumferential surface of the cylindrical portion 61 of the inner housing main body 60, and the female terminal portions 14 of the pair of terminals 10 are inserted into the pair of female terminal accommodating portions 64 of the inner housing main body 60 (see FIG. 12). When this attachment is completed, as shown in FIG. 12, the front end surfaces of the pair of side wall portions 53 of the base holder 30 abut on the rear end surfaces of the flange portion 65 of the inner housing main body 60.

When the attachment of the inner housing main body 60 to the base holder 30 is completed, the outer housing main body 70 is then attached to the inner housing main body 60 (see FIGS. 3 and 12). Therefore, the outer housing main body 70 is attached to the inner housing main body 60 from the front side such that the cylindrical portion 71 of the outer housing main body 70 covers the outer circumferential surface of the cylindrical portion 61 of the inner housing main body 60 (see FIG. 12). When this attachment is completed, the rear end surface of the cylindrical portion 71 of the outer housing main body 70 abuts on the front end surface of the flange portion 65 of the inner housing main body 60, as shown in FIG. 12.

When the attachment of the outer housing main body 70 to the inner housing main body 60 is completed, as shown in FIG. 3, a plurality of (four, in the present embodiment) the bolts 91 are inserted from the rear side into a plurality of the bolt insertion holes 55 of the base holder 30 and a plurality of the bolt insertion holes 67 of the inner housing main body 60, and tightened at a plurality of tightening points (not shown) provided in the outer housing main body 70. As a result, the base holder 30 and the inner housing main body 60 are tightened together with the outer housing main body 70, so that the base holder 30, the rear holder 40, the inner housing main body 60, and the outer housing main body 70, which are the components of the skeletal components of the housing 20, are integrated. Accordingly, the assembly of the connector 1 is completed, and the connector 1 shown in FIG. 1 is obtained.

The assembled connector 1 is fastened and fixed to the attachment target portion (not shown) of the connector 1 provided in the vehicle, using a plurality of bolts (not shown) inserted into the plurality of bolt insertion holes 73 of the outer housing main body 70.

When the battery (not shown) mounted in the vehicle is charged, the mating connector (so-called charging gun) is fitted into the fitting recess 63 of the connector 1 fixed to the attachment target portion of the vehicle. As a result, power is supplied to the battery from the outside of the vehicle via the mating connector, the connector 1, and the pair of electric wires 2 in this order, charging the battery.

Next, the effect of providing the heat storage member 95 and the heat transfer member 96 in the connector 1 will be described. As described above, when the battery is charged using the connector 1, the temperature of the pair of terminals 10 in the connector 1 rises due to Joule heat caused by energization. In particular, although the connection point between the electric wire 2 and the terminal 10 generates a large amount of heat due to the large contact resistance, it is difficult to dissipate the heat to the outside. The reason for this is that the internal space 31a of the terminal holding part 31 is sealed with the O-ring 92 and the packing 93 and isolated from the outside, and the air in the insulated internal space 31a acts as a heat insulating material. Therefore, in order to alleviate the temperature rise of the terminal 10, it is important to efficiently absorb the heat generated at the connection point between the electric wire 2 and the terminal 10.

In this regard, in the present embodiment, the heat storage member 95 that contacts the connection point between the electric wire 2 and the terminal 10 is accommodated in the internal space 31a of the terminal holding part 31. In other words, the heat storage member 95 is disposed so as to reduce the gap H (see FIGS. 11 and 12) around the connection point between the electric wire 2 and the terminal 10 in the internal space 31a.

Furthermore, the heat storage member 95 is made of metal. Generally, when comparing the metal member and air in the same volume, the heat capacity of the metal member is greater than that of air because the density of metal is higher than the density of air. Therefore, the heat capacity of the heat storage member 95 made of metal is greater than the heat capacity of air in the same volume as the heat storage member 95. That is, by accommodating the heat storage member 95 made of metal in the internal space 31a of the terminal holding part 31, it is possible to further increase the substantial heat capacity of the entire internal space 31a. Furthermore, due to the presence of the heat storage member 95 in the internal space 31a, the amount of air in the internal space 31a that acts as a heat insulating material can be reduced. It is to be noted that the material for the heat storage member 95 is not necessarily limited to metal, and may be any other material that has a heat capacity that can make the substantial heat capacity of the entire internal space 31a greater than when the heat storage member 95 is not provided, as described above.

As described above, the heat generated at the connection point between the electric wire 2 and the terminal 10 upon energization is absorbed by the heat storage member 95 with a large heat capacity, so that even when a large amount of heat is generated at the connection point per unit time, such as during rapid charging, a sudden increase in the temperature of the terminal 10 can be suppressed and the temperature of the terminal 10 can be gradually increased.

Furthermore, in the present embodiment, the cylindrical heat storage member 95 is formed by assembling the pair of upper and lower heat storage division bodies 95z. As a result, for example, by assembling the pair of upper and lower heat storage division bodies 95z after connecting the electric wire

2 and the terminal 10, without requiring a pre-process such as passing the electric wire 2 through the cylinder of the heat storage member 95 before connecting the electric wire 2 and the terminal 10 (that is, before crimping the terminal 10), the heat storage member 95 can be arranged so as to surround the connection point between the electric wire 2 and the terminal 10.

Furthermore, in the present embodiment, by fitting the protrusions 95b of the heat storage member 95 into the crimping marks 12a of the terminals 10, the volume of the heat storage member 95 can be increased by the amount of the protrusions 95b, thereby improving heat storage performance. Furthermore, as the protrusion 95b of the heat storage member 95 enters a depression of the crimping mark 12a, a surface area that contributes to heat transfer between the two increases, and heat absorption from the connection point between the electric wire 2 and the terminal 10 and heat dissipation to the outside can be performed more efficiently.

Furthermore, in the present embodiment, the heat transfer member 96 made of a material having fluidity and viscosity is disposed in the internal space 31a of the terminal holding part 31 so as to fill the gap H (see FIG. 12) remaining around the heat storage member 95. As a result, heat transfer from the connection point between the electric wire 2 and the terminal 10 to the heat storage member 95 (that is, heat absorption from the connection point) and heat transfer (that is, heat dissipation to the outside) from the heat storage member 95 to the terminal holding part 31 (that is, the housing 20) can be performed more efficiently.

Actions and Effects

As described above, with the connector 1 according to the present embodiment, the connection point between the electric wire 2 and the terminal 10 and the heat storage member 95 are accommodated in the internal space 31a of the terminal holding part 31 in the housing 20. In other words, the heat storage member 95 is disposed so as to reduce the gap H (see FIG. 12) around the connection point in the internal space 31a. As a result, the heat generated at the connection point between the electric wire 2 and the terminal 10 upon energization is absorbed by the heat storage member 95 with a large heat capacity, so that even when a large amount of heat is generated at the connection point per unit time, such as during rapid charging, a sudden increase in the operating temperature of the terminal 10 can be suppressed and the operating temperature of the terminal 10 can be gradually increased. Therefore, with the connector 1 according to the present embodiment, it is possible to suppress an excessive rise in the operating temperature of the terminal 10 while avoiding an increase in the size of the connector 1.

Furthermore, the heat storage member 95 has a cylindrical shape, and is formed by assembling together the upper heat storage division body 95z that forms a part in the circumferential direction, with the lower heat storage division body 95z that forms another part in the circumferential direction. As a result, for example, by assembling the pair of upper and lower heat storage division bodies 95z after connecting the electric wire 2 and the terminal 10, without requiring a pre-process such as passing the electric wire 2 through the cylinder of the heat storage member 95 before connecting the electric wire 2 and the terminal 10 (e.g., before crimping the terminal 10), the heat storage member 95 can be arranged so as to surround the connection point between the electric wire 2 and the terminal 10. Therefore, the degree of freedom in the manufacturing process of the connector 1 is improved.

Furthermore, the heat transfer member 96 is disposed in the internal space 31a so as to fill the gap H (see FIG. 12) remaining around the heat storage member 95. As a result, the heat transfer member 96 is disposed between the connection point between the electric wire 2 and the terminal 10 and the heat storage member 95, so that heat transfer from the connection point to the heat storage member 95 (that is, heat absorption from the connection point) can be performed more efficiently. Furthermore, the heat transfer member 96 is disposed between the heat storage member 95 and the housing 20 (the base holder 30), so that heat transfer from the heat storage member 95 to the housing 20 (that is, heat dissipation to the outside) can be performed more efficiently.

Furthermore, by fitting the protrusions 95b of the heat storage member 95 into the crimping marks 12a of the terminals 10, the volume of the heat storage member 95 can be increased by the amount of the protrusions 95b, thereby improving heat storage performance. Furthermore, as the protrusion 95b of the heat storage member 95 enters the depression of the crimping mark 12a, the surface area that contributes to heat transfer between the two increases, and heat absorption from the connection point between the electric wire 2 and the terminal 10 and heat dissipation to the outside can be performed more efficiently. In addition, from the viewpoint of more efficient heat transfer, it is preferable that the recessed surface of the crimping mark 12a of the terminal 10 and the protrusion 95b of the heat storage member 95 are brought into close contact with each other so as to contact each other.

Furthermore, when two components 95z of the heat storage member 95 are assembled, the protrusions 95e of either component 95z are engaged with each other, thereby biasing a pair of the components 95z in a direction of approaching each other. Accordingly, the heat storage member 95 is pressed against the connection point between the electric wire 2 and the terminal 10, or the gap between the heat storage member 95 and the connection point is reduced. As a result, the surface area that contributes to heat transfer between the two increases, and heat absorption from the connection point and heat dissipation to the outside can be performed more efficiently.

It is to be noted that the present disclosure is not limited to the embodiments described above, and various modifications can be adopted within the scope of the present disclosure. For example, the present disclosure is not limited to the embodiments described above, but may encompass modifications or improvements, as appropriate. In addition, materials, shapes, dimensions, numbers, positions, and the like of the elements in the embodiment described above are not limited, but are freely selected as far as the present disclosure can be achieved.

For example, in the embodiment described above, as the heat transfer member 96, a fluid member obtained by mixing a substance such as alumina particles that promotes heat transfer into a base material such as grease or silicone paste with fluidity and viscosity is used. On the other hand, as the heat transfer member 96, a cylindrical member including a metal mesh may be used.

Here, the features of the embodiment of the connector 1 according to the present disclosure described above are summarized briefly as first to fourth aspects described below.

In the first aspect, the connector 1 includes: the electric wire 2; and the terminal 10 that is connected to the electric wire 2; the housing 20 that has an accommodation space 31a therein for accommodating a connection point between the electric wire 2 and the terminal 10; a seal member 93 that seals the opening of the accommodation space 31a so as to insulate the connection point accommodated in the accommodation space 31a from the outside; and the cylindrical heat storage member 95 that is disposed in the accommodation space 31a so as to surround the connection point, in which the heat storage member 95 includes a plurality of components in the circumferential direction of the heat storage member 95, including the component 95z forming a part of the heat storage member 95 and the component 95z forming another part, and is formed by assembling the plurality of components.

According to the connector having the configuration of the first aspect, the connection point between the electric wire and the terminal, and the heat storage member are accommodated in the accommodation space in the housing. In other words, the heat storage member is disposed so as to reduce the gap around the connection point in the accommodation space. As a result, the heat generated at the connection point between the electric wire and the terminal upon energization is absorbed by the heat storage member with a large heat capacity, so that even when a large amount of heat is generated at the connection point per unit time, such as during rapid charging, a sudden increase in the operating temperature of the terminal can be suppressed and the operating temperature of the terminal can be gradually increased. Furthermore, due to the presence of the heat storage member in the accommodation space, the amount of air in the accommodation space that acts as a heat insulating material can be reduced. Therefore, with the connector having this configuration, it is possible to suppress an excessive rise in the operating temperature of the terminal while avoiding an increase in the size of the connector.

Furthermore, according to the connector having the above-described configuration, the heat storage member has a cylindrical shape, includes a plurality of components in the circumferential direction, including a first component forming a part and a second component forming another part, and is formed by assembling the plurality of components. As a result, for example, by assembling the plurality of components after connecting the electric wires and the terminals, without requiring a pre-process such as passing the electric wires through the cylinder of the heat storage member before connecting the electric wires and the terminals (e.g., before crimping terminals), the heat storage member can be disposed to surround the connection point. Therefore, the degree of freedom in the manufacturing process of the connector is improved.

In the second aspect, the connector 1 according to the first aspect described above, further includes the heat transfer member 96 that is disposed in the accommodation space 31a so as to fill at least a part of the gap H remaining around the heat storage member 95 in the accommodation space 31a.

According to the connector having the configuration of the second aspect, the heat transfer member is disposed in the accommodation space so as to fill at least a part of the gap remaining around the heat storage member. As a result, for example, if the heat transfer member is disposed between the connection point between the electric wire and the terminal and the heat storage member, heat transfer from the connection point to the heat storage member (that is, heat absorption from the connection point) can be performed more efficiently. Further, for example, if the heat transfer member is disposed between the heat storage member and the housing, heat transfer from the heat storage member to the housing (that is, heat dissipation to the outside) can be performed more efficiently.

In the third aspect, in the connector 1 according to the first aspect described above, the cylindrical terminal 10 is connected to the electric wire 2 by crimping the terminal 10 to the electric wire 2 and has the recessed crimping mark 12a on the surface of the terminal 10, and the heat storage member 95 includes the protrusion 95b protruding toward the crimping mark 12a on the inner surface of the cylinder and is disposed such that the protrusion 95b is fitted into the crimping mark 12a.

According to the connector having the configuration of the third aspect, by fitting the protrusions of the heat storage member into the crimping marks of the terminals, the volume of the heat storage member can be increased by the amount of the protrusions, thereby improving heat storage performance. Furthermore, as the protrusion of the heat storage member enters the depression of the crimping mark, the surface area that contributes to heat transfer between the two increases, and heat absorption from the connection point and heat dissipation to the outside can be performed more efficiently. In addition, from the viewpoint of more efficient heat transfer, it is preferable that the recessed surface of the crimping mark of the terminal and the protrusion of the heat storage member are brought into close contact with each other so as to contact each other.

In the fourth aspect, in the connector according to the first aspect described above, the plurality of components 95z include the first component 95z having the first engaging part 95e and the second component 95z having the second engaging part 95e, and are configured such that when the first engaging part 95e and the second engaging part 95e are engaged with each other, the first component 95z and the second component 95z are biased in a direction of approaching each other.

According to the connector having the configuration of the fourth aspect, in which, when the plurality of components of the heat storage member are assembled, by engaging the first engaging part of the first component with the second engaging part of the second component, the first component and the second component are biased in a direction of approaching each other. As a result, the heat storage member is pressed against the connection point between the electric wire and the terminal, or the gap between the heat storage member and the connection point is reduced. As a result, the surface area that contributes to heat transfer between the two increases, and heat absorption from the connection point and heat dissipation to the outside can be performed more efficiently.

The invention claimed is:

1. A connector comprising:
an electric wire;
a terminal that is connected to the electric wire;
a housing that has an accommodation space therein for accommodating a connection point between the electric wire and the terminal;
a seal member that seals an opening of the accommodation space so as to insulate the connection point accommodated in the accommodation space from an outside; and
a cylindrical heat storage member that is disposed in the accommodation space so as to surround the connection point, wherein
the heat storage member includes a plurality of components in a circumferential direction of the heat storage member, including a component forming a part of the heat storage member and a component forming another part, and the plurality of components are in contact with each other.

2. The connector according to claim 1, further comprising:
a heat transfer member that is disposed in the accommodation space so as to fill at least a part of a gap remaining around the heat storage member in the accommodation space.

3. The connector according to claim 1, wherein:
the cylindrical terminal is connected to the electric wire by crimping the terminal to the electric wire and has a recessed crimping mark on a surface of the terminal; and
the heat storage member includes a protrusion protruding toward the crimping mark on an inner surface of the cylinder and is disposed such that the protrusion is fitted into the crimping mark.

4. The connector according to claim 1, wherein the plurality of components include a first component having a first engaging part and a second component having a second engaging part, and are configured such that when the first engaging part and the second engaging part are engaged with each other, the first component and the second component are biased in a direction of approaching each other.

* * * * *